United States Patent Office 3,564,079
Patented Feb. 16, 1971

3,564,079
METHOD OF IMPROVING THE TACK OF ETHYLENE-PROPYLENE POLYMERS
Anthony C. Soldatos, Kendall Park, N.J., assignor to Union Carbide Corporation, a corporation of New York
No Drawing. Filed Jan. 30, 1968, Ser. No. 701,574
The portion of the term of the patent subsequent to Jan. 20, 1987, has been disclaimed
Int. Cl. C08d 9/08
U.S. Cl. 260—889          8 Claims

ABSTRACT OF THE DISCLOSURE

This invention relates to a method of improving the tack of ethylene-propylene polymers by adding thereto a polymer of isoprene and subjecting the resultant compositions to a heating cycle under controlled conditions of temperature and humidity.

---

This invention relates to a method of improving the tack of ethylene-propylene polymers. More specifically, this invention relates to a method of improving the tack of ethylene-propylene polymers, without materially affecting the basic strength characteristics thereof, by adding to the ethylene-propylene polymers, a polymer of isoprene and thereafter subjecting the resultant compositions to a heating cycle under controlled conditions of temperature and humidity with the result that the ultimate compositions are characterized by excellent tack and are particularly desirable for use in the manufacture of automobile tires, conveyer belts and other like energy absorbing products.

In the past, various expedients have been tried in an attempt to improve the tack of ethylene-propylene polymers. As a general rule, these expedients have involved the use of additives to the ethylene-propylene polymers. It has been found, however, that the addition of materials to ethylene-propylene polymers, in amounts sufficient to significantly improve the tack thereof, has resulted in an undesirable decrease in the physical strengths of the polymers. As an illustration, the addition to these polymers of such additives as alkylated phenol-formaldehyde resins has significantly lowered their tensile modulus.

The present invention provides for improving the tack of ethylene-propylene polymers without affecting, undesirably, their physical strengths by subjecting compositions based on these polymers to a heating cycle under controlled conditions of temperature and relative humidity. By means of the present invention, it is now possible to use relatively small amounts of an additive to effect a significant improvement in the tack of ethylene-propylene polymers thus providing an economically attractive method of improving the tack of such polymers.

According to the present invention, the tack of ethylene-propylene polymers is significantly improved by adding thereto a polymer of isoprene and subjecting the resultant compositions to a temperature of about 75° F. to about 100° F. and preferably about 80° F. to about 90° F. while under a relative humidity of about 10 percent to about 90 percent and preferably about 15 percent to about 50 percent.

Illustrative of polymers of isoprene which are used in accordance with this invention, are homopolymers of isoprene which generally have a number average molecular weight of about 500 to about 30,000, preferably a number average molecular weight of about 500 to about 10,000 and more preferably have a number average molecular weight of about 1,000 to about 8,000; and which contain less than about 50 percent by weight and preferably less than about 20 percent by weight internal unsaturation (based on the weight of the total unsaturation).

Number average molecular weight was determined by Vapor Phase Osmometry.

Total unsaturation was determined by Wijs method (modified by correcting for substitution reactions).

Internal unsaturation was determined by Nuclear Magnetic Resonance and Infra-Red Analysis.

Internal unsaturation as used herein refers to unsaturated units which make-up the backbone of the polymer as opposed to pendant unsaturated units.

For instance, internal unsaturation with respect to isoprene refers to the percent by weight of the diene units of isoprene (2-methyl butadiene-1,3) which have combined at the 1,4 position as opposed to the 1,2 and 3,4 positions.

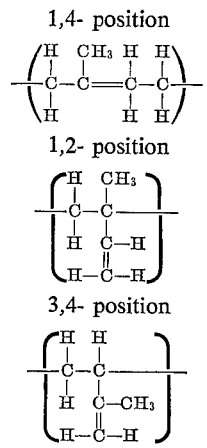

It is to be understood that homopolymers of isoprene as used herein are intended to include halogenated, hydrogenated and other like homopolymers of isoprene.

Preparation of polymers of isoprene, particularly homopolymers of isoprene, having the number average molecular weight and the unsaturation previously described can be conducted as described in this application and also as described in the following articles.

Quarterly Review, vol. 16, page 361—1962, "Stereo Regular Addition Polymerization," C. F. H. Bawan and A. Ledwith Journal of Polymer Science, vol. 3, pages 2223–28, 1965, "Solvent Effect in Anionic Copolymerization Reactivity of Dienes," K. F. O'Driscoll Journal of Polymer Science, vol. 27, 1957, "Polymerization of Isoprene with Lithium Dispersions and Lithium Alkyls using Tetrahydrofuran as Solvent," Henry Hsieh, D. J. Kelly, A. V. Tobolsky Journal of Polymer Science, vol 40, pages 73–89 1959, "Isoprene Polymerization by Organometallic Compounds," A. V. Tobolsky, C. E. Rogers.

Among other suitable polymers of isoprene are those obtained by polymerizing isoprene with one or more of a compound having at least one olefinic double bond to obtain a copolymer or interpolymer having the number average molecular weight and the internal unsaturation previously defined and containing at least about 70 percent by weight combined isoprene. Exemplary of suitable monomers having at least one olefinic double bond are described subsequently in this application. These polymers can be hydrogenated, halogenated and the like as previously described.

Other suitable polymers of isoprene are those obtained by reacting a phenol with a polymer of isoprene to produce phenolated polymers of isoprene. Among suitable phenols for this purpose are those compounds which have the formula:

$$R(OH)_n$$

wherein R is an aromatic hydrocarbon radical generally containing a maximum of 31 carbon atoms and preferably containing a maximum of 21 carbon atoms and $n$ is an integer having a value of 1 to 3 inclusive.

Especially desirable phenols are those having the formula:

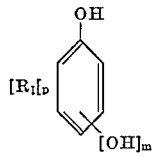

wherein each $R^1$, which can be the same or different, is an alkyl radical generally containing a maximum of 25 carbon atoms and preferably containing a maximum of 15 carbon atoms, an alkoxy radical generally containing a maximum of 25 carbon atoms and preferably containing a maximum of 15 carbon atoms, a cycloaliphatic radical generally containing a maximum of 25 carbon atoms and preferably containing a maximum of 12 carbon atoms, nitro, sulfone, sulfur, or halogen, i.e., chlorine, bromine, fluorine or iodine; $p$ is an integer having a value of 0 to 5 inclusive, $m$ is an integer having a value of 0 to 3 inclusive and the maximum sum of $p+m=5$.

Illustrative of suitable phenols are the following: phenol, nitrophenol, thiophenol, alkylated phenols such as m-cresol, o-ethyl phenol, m-ethyl phenol, p-isopropyl phenol, p-tertbutyl phenol, o-amyl phenol, p-hexyl phenol, p-nonyl phenol, p-octyl phenol, o-nonyl penol, p-dodecyl phenol, o-dodecyl phenol, 2,6-di-nonyl phenol, 2,4-diethyl phenol, 2,4-di-hexyl phenol, 2,4-dinonyl phenol, 2,4-didodecyl phenol, 2,3,5-triethyl phenol, 2,3,5-trihexyl phenol, 2,3,4,5-tetra-hexyl phenol and other like phenols, as well as the commercially available meta-cresol which contains small amounts of both the para and the ortho isomers; alkoxylated phenols, exemplary of which are m-methoxy phenol, o-methoxy phenol, p-methoxy phenol, m-hexoxy phenol, o-hexoxy phenol, p-hexoxy phenol, 2,4 - dimethoxy phenol, 2,4 - di - hexoxy phenol, 2,3,5-trimethoxyphenyl, 2,3,5 - trihexoxy phenol, 2,3,4,5-tetra-hexoxy phenol and the like; halogenated phenols such as ortho, meta or para bromo phenol, 2,4-dichlorophenol and 2,3,5 - trichlorophenol, 3 - chloro-4 - methyl phenol, 4 - bromo - 6 - ethoxy phenol and the like; styryl phenol, cymyl phenol, α-methyl styryl phenol and the like; polyhydric phenols such as pyrocatechol hydroquinone, resorcinol and the like; alkylated dihydroxy phenols such as 1,3-dihydroxy-4-methylbenzene, 1,2-dihydroxy-4-hexylbenzene and the like; alkoxylated dihydroxy phenols such as 1,4-dihydroxy-3-hexoxybenzene and the like; cycloaliphatic phenols such as p-cyclopentyl phenol, p-cyclohexyl phenol and the like; halogenated dihydroxy phenols such as 1,2-dihydroxy-4-chlorobenzene and the like; trihydric phenols such as phloroglucinol, pyrogallol and the like; polynuclear phenols such as 2,2-bis(p-hydroxyphenyl)-propane and the like.

As a general rule, the phenolated polymers of isoprene contain about 5 to about 75 percent by weight and preferably about 10 to about 40 percent by weight combined phenol based on the total weight of the polymer.

Phenolated polymers of isoprene can be prepared as described in this application and also as described in U.S. Pat. 3,177,166, issued Apr. 6, 1965, to J. T. Gregory et al.

Suitable ethylene-propylene polymers for this invention are those which can be cured to elastomeric products. Among such suitable polymers are the copolymers and interpolymers containing at least about 20 percent by weight combined ethylene, preferably about 20 to about 80 percent by weight combined ethylene and at least about 20 percent by weight combined propylene.

Among suitable polymers, as previously stated are copolymers of ethylene-propylene and interpolymers of ethylene-propylene and a polymerizable monomer having at least one olefinic double bond wherein, in each case, the combined ethylene and combined propylene are as defined above.

Illustrative of suitable mono-olefinic compounds are those having the formula:

$$R^2-CH=CH_2$$

wherein $R^2$ is a monovalent hydrocarbon radical generally containing a maximum of 10 carbon atoms and preferably containing a maximum of 8 carbon atoms. Among such monovalent hydrocarbon radicals are the alkyl radicals such as ethyl, propyl, hexyl, 2-ethylhexyl and the like; aromatic radicals such as phenyl, naphthyl and the like; cycloalipatic radicals such as cyclohexyl, n-propyl cyclohexyl and the like.

Methods for preparing copolymers of ethylene-propylene and interpolymers of ethylene-propylene and a mono-olefinic compound are described in detail in U.S. Pat. 3,000,867 to B. S. Fisher and 2,975,159 to V. Weinmayr, respectively.

Suitable diene monomers which can be used to produce interpolymers and methods for polymerizing these diene monomers with ethylene and propylene are described in U.S. Pat. 3,000,866 to R. E. Tarney and 3,211,709 to S. Adamek et al.

Especially desirable diene monomers are hexadiene-1,4,dicylopentadiene, ethylidenebicycloheptene and the like.

In carrying out the present invention, the polymers of isoprene are added to the ethylene-propylene polymers in amounts sufficient to increase the tack thereof. As a rule, this amount is at least about 3 percent by weight isoprene polymer based on the weight of ethylene-propylene polymer, and generally about 8 to about 100 percent by weight. Particularly effective results are achieved using from about 12 to about 20 percent by weight isoprene polymer based on the weight of the ethylene-propylene polymer.

It is to be understood that mixtures of isoprene polymers and/or mixtures of ethylene-propylene polymers can be used if so desired. The addition of one to the other can be carried out on a two-roll mill, in a Banbury mixer or a twin screw extruder.

Once the compositions are formulated they are generally formed into sheet form, as for example on a two-roll mill and subjected to the heating cycle described.

The period of time to which each composition is subjected to the heating cycle will depend on the concentration of the isoprene polymer as well as to the exact formulation of the composition. As a general rule, the compositions are subjected to the heating cycle for periods of time of about 5 hours to about 96 hours and preferably about 12 hours to about 48 hours.

To the compositions of this invention can be added pigments, fillers, lubricants, plasticizers, curing agents, accelerators, stabilizers, antioxidants, other rubbers such as styrene-butadiene-1,3 rubbers and the like as is well-known in the art. Specific additives are pigments such as carbon black and clay; lubricants such as stearic acid and plasticizers such as naphthenic oils.

In those instances wherein the compositions of this invention contain a polymer of ethylene-propylene which is devoid of olefinic unsaturation for instance, a copolymer of ethylene and propylene, or an interpolymer of ethylene-propylene and a mono-olefinic compound, the compositions can be cured to elastomeric products using an organic peroxide such as dicumyl peroxide. In those instance wherein the polymer of ethylene-propylene contains olefinic unsaturation such as an interpolymer of ethylene-propylene and hexadiene-1,4, the compositions can be cured to elastomeric products using sulfur.

The amount of curing agent, the length of the curing cycle and the temperature thereof will depend, in each instance, upon the exact formulation of the compositions, as for example, is described in U.S. Pat. 3,200,174 and also as described in this application.

It is to be understood that the disclosure of all patents and literature references are incorporated herein by reference.

In order to demonstrate the excellent "tack" effect by the method of this invention, various compositions were formulated, formed into strips—one inch by six inches by ⅛ of an inch, subjected to the heating cycle and tested for tack at room temperature, 70° F., and also under the same conditions as in the heating cycle.

The test for tack was carried out by pressing two such strips together using a two-pound roller and then manually pulling the strips apart. "Tack" was judged on the basis of the difficulty encountered in attempting to manually separate the strips. Results reported were based on intervals of time from the time at which the compositions were subjected to the heating cycle.

The various isoprene polymers used in formulating the compositions were prepared as follows:

PREPARATION OF POLYMER A— POLYISOPRENE

Into a two-liter flask equipped with a stirrer, reflux condenser and dropping funnel, there was distilled 1,000 ml. of tetrahydrofuran which had been dried using lithium aluminum hydride. During this distillation the system was continuously purged with nitrogen gas. To the distilled tetrahydrofuran there was first added 0.130 mole of butyl lithium in 80 ml. of n-heptane and then 122 grams of isoprene in 6.8 gram portions over a period of one hour. During the addition of the isoprene, the temperature of the reaction mixture was maintained at 50° C.–55° C. After the addition of the isoprene, the reaction mixture was maintained at a temperature of 60° C. for 2 hours while being constantly stirred. Methanol was added to the mixture and the product polyisoprene was recovered as the methanol insoluble portion of the mixture. The polyisoprene was stabilized by adding thereto 0.05 gram of 2,6 - di - t - butyl - 4 - methylphenol and then dried by being placed in a vacuum oven for 18 hours. The vacuum oven was at a temperature of 40° C. and was operating under a pressure of 5 mm. Hg.

*Analysis.*—Number average molecular weight=2000. Percent internal unsaturation=5. Yield=116 grams of a viscous liquid.

PREPARATION OF POLYMER B— PHENOLATED POLYISOPRENE

Into a two-liter flask equipped with a stirrer and reflux condenser, there was charged 602 grams of p-dodecyl phenol and 40 grams of polyisoprene (Polymer A). To this mixture there was then added 10.4 grams of p-toluene sulfonic acid and the reaction mixture heated to a temperature of about 80° C. and maintained at this temperature for seen hours while under a nitrogen gas atmosphere. After this seven hour period, the reaction mixture was allowed to stand for 24 hours at a temperature of about 30° C. The phenolated polyisoprene was recovered as described with respect to Polymer A.

*Analysis.*—Number average molecular weight=2700. Melting point=87° C.–92° C. Percent by weight combined p-dodecyl phenol=23 based on the total weight of the isoprene polymer. Percent internal unsaturation=5.

PREPARATION OF POLYMER C— PHENOLATED POLYISOPRENE

Into a two-liter flask equipped with a stirrer and reflux condenser, there was charged 520 grams of p-nonyl phenol and 40 grams of polyisoprene (Polymer A). To this mixture there was then added 10.4 grams of p-toluene sulfonic acid and the reaction then carried out in a manner described for Polymer B.

*Analysis.*—Number average molecular weight=2600. Melting point=92° C.–98° C. Percent by weight combined p-nonyl phenol=20 based on the total weight of the isoprene polymer. Percent internal unsaturation=5.

PREPARATION OF POLYMER D— PHENOLATED POLYISOPRENE

Into a two-liter flask equipped with a stirrer and reflux condenser, there was charged 450 grams of phenol and 55 grams of polyisoprene (Polymer A). To this mixture there was then added 14.3 grams of p-toluene sulfonic acid and the reaction mixture was heated to a temperature of 100° C. and maintained at this temperature for one hour while under a nitrogen gas atmosphere. The reacted mixture was distilled to a pot temperature of 150° C. under a pressure of 28 mm. Hg.

*Analysis.*—Number average molecular weight=2500. Melting point=164° C.–168° C. Percent by weight combined phenol=16 based on the total weight of the isoprene polymer. Percent internal unsaturation=4.

PREPARATION OF POLYMER E— PHENOLATED POLYISOPRENE

Into a two-liter flask equipped with a stirrer and reflux condenser, there was charged 320 grams of thiophenol and 30 grams of polyisoprene. To this mixture there was then added 7.8 grams of p-toluene sulfonic acid and the reaction then conducted in a manner as described for Polymer B.

*Analysis.*—Number average molecular weight=3400. Melting point=82° C.–84° C. Percent by weight combined thiophenol=15 based on the total weight of the isoprene polymer. Percent internal unsaturation=15.

The polyisoprene used in this example was a liquid product having a number average molecular weight of 3000 and having 15 percent internal unsaturation.

PREPARATION OF POLYMER F— PHENOLATED POLYISOPRENE

Into a two-liter flask equipped with a stirrer and reflux condenser, there was charged 1500 grams of o-t-butylphenol and 136 grams of polyisoprene (Polymer A). To this mixture there was then added 16.4 grams of boron-trifluoridephenol complex containing 23 percent by weight boron-trifluoride and the reaction then carried out in a manner described for Polymer B.

*Analysis.*—Number average molecular weight=2400. Melting point=138° C.–141° C. Percent by weight combined o-t-butylphenol=21 based on the total weight of the isoprene polymer. Percent internal unsaturation=5.

PREPARATION OF POLYMER G— HYDROGENATED POLYISOPRENE

Polyisoprene (Polymer A) was dissolved in 100 grams of hexane and the resultant solution, after the addition thereto of 5 percent by weight platinum on charcoal, was charged into a pressure vessel. Hydrogen, under a pressure of 1500 p.s.i., was fed into the vessel as the vessel was vibrated. After about 5 minutes, the pressure in the vessel dropped to 1200 p.s.i. The hydrogen pressure was then increased to 1500 p.s.i. and this step repeated until no further decrease in pressure was observed. The solution was then filtered and vacuum distilled to a solid residue.

*Analysis.*—Number average molecular weight=2000. Melting point=75° C.–80° C. Percent internal unsaturation=5.

A masterbatch composition, the formulation of which is noted below, was compounded to a blend in a Banbury mixer.

Masterbatch Composition I: Parts by Wt.
Terpolymer of ethylene-propylene hexadiene-1,4 containing 50 percent by weight combined ethylene, 48 percent by weight combined propylene with the remainder being hexadiene-1,4 _____ 100
Zinc oxide _____ 5
Stearic acid _____ 1
Carbon black _____ 80
Naphthenic oil _____ 40
Sulfur _____ 1.5
Tetramethyl-thiuran monsulfide _____ 1.5
2-mercaptobenzothiazole _____ 0.75

To samples of the masterbatch composition, were added various amounts of isoprene polymers. Each isoprene polymer was dispersed in the sample of the masterbatch by a milling operation on a two-roll mill which had been preheated to a temperature of 80° C.–90° C. Each composition was sheeted on the two-roll mill and cut into strips, 1 inch by 6 inches by ⅛ inch. These strips were then subjected to the heating cycle described below and used in the tack test previously described. The results of these tests are shown in Table I.

TABLE I

| Polymer | Parts by wt. Polymer based on 100 parts by wt. ethylene-propylene polymer | Test for tack | Time in hours | Temp., degrees F. | Relative humidity, percent | Tensile modulus ASTMD-412, p.s.i. |
|---|---|---|---|---|---|---|
| 1. Polymer B | 5 | Strips were non-separable | 96 | 75 | 12 | 1,200 |
| 2. Polymer B | 5 | ___do___ | 72 | 85 | 18 | 1,200 |
| 3. Polymer B | 5 | ___do___ | 48 | 80 | 18 | 1,200 |
| 4. Polymer B | 5 | ___do___ | 48 | 90 | 18 | 1,200 |
| 5. Polymer B | 10 | ___do___ | 24 | 75 | 60 | 1,000 |
| 6. Polymer B | 15 | ___do___ | 24 | 75 | 75 | 750 |
| 7. Polymer B | 20 | ___do___ | 12 | 80 | 18 | 650 |
| 8. Control 1 | | No tack | 45 | 80 | 18 | 1,400 |

[1] Contained no isoprene polymer.
NOTE.—Similar results were achieved using Polymers A, C–G in lieu of Polymer B.

Controls were also run using the same compositions as described in 1–7 of Table 1. These compositions were not subjected to the heating cycle but were tested for tack 1 day after formulation during which time they were kept at room temperature about 70° F. It was found that in order to achieve a non-separable condition, these compositions had to have a "polymer content" of at least 15 percent based on the weight of the ethylene-propylene polymer. A composition containing a Polymer B in an amount of 15 percent by weight had a tensile modulus on the order of 750 p.s.i.

The results of the data clearly indicate that by subjecting the compositions to the heating cycle of this invention, a significant improvement is achieved in tack, with less additive, and with less of a change with respect to physical strengths.

As a rule the heating cycle is conducted under atmospheric pressure although super or subatmospheric pressures can be used.

What is claimed is:

1. A method of improving the tack of a composition comprising an ethylene-propylene polymer and at least about 3 percent by weight a phenolated polymer of isoprene wherein the polymer of isoprene is:

(1) a homopolymer of isoprene or
(2) a polymer of isoprene and at least one monomer having at least one olefinic double bond, said polymer containing at least about 70 percent by weight combined isoprene and;

wherein the said polymer of isoprene has a number average molecular weight of about 500 to about 30,000 and contains less than about 50 percent by weight internal unsaturation, which comprises heating said composition at a temperature of about 75° F. to about 100° F., under a relative humidity of about 10 percent to about 90 percent, for a period of time of about 5 hours to about 96 hours.

2. Method as defined in claim 1 wherein the heating cycle ranges from about 12 to about 48 hours.

3. Method as defined in claim 1 wherein the polymer of isoprene is phenolated with a phenol having the formula:

$$R(OH)_n$$

wherein R is an aromatic hydrocarbon radical containing a maximum of 31 carbon atoms and $n$ is an integer having a value of 1 to 3 inclusive.

4. Method of improving the tack of an ethylene-propylene polymer which comprises adding thereto a phenolated polymer of isoprene, as defined in claim 1, in an amount of at least about 3 percent by weight and heating the resultant composition at a temperature of about 75° F. to about 100° F. under a relative humidity of about 10 percent to about 90 percent for at least about 5 hours.

5. Method as defined in claim 1 wherein the composition is heated at a temperature of about 80° F. to about 90° F. under a relative humidity of about 15 percent to about 50 percent.

6. Method as defined in claim 1 wherein the phenolated polymer is polyisoprene phenolated with dodecylphenol.

7. Method as defined in claim 3 wherein the said composition is heated at a temperature of about 80° F. to about 90° F. under a relative humidity of about 15 percent to about 50 percent.

8. Method as defined in claim 1 wherein said polymer of isoprene has an average number molecular weight of about 1000 to about 8000 and contains less than about 20 percent internal unsaturation.

References Cited

UNITED STATES PATENTS

| 3,110,699 | 11/1963 | Schmitz-Josten | 260—62 |
| 3,177,166 | 4/1965 | Gregory et al. | 260—5 |
| 3,177,166 | 4/1965 | Gregory et al. | 260—5 |
| 3,359,221 | 12/1967 | Schoenbeck | 260—889 |
| 3,380,952 | 4/1968 | Cluff et al. | 260—889 |
| 3,383,362 | 5/1968 | Gonzenaback | 260—62 |
| 3,491,167 | 1/1970 | Soldatos | 260—889 |

SAMUEL H. BLECH, Primary Examiner

M. J. TULLY, Assistant Examiner

U.S. Cl. X.R.

260—62, 94.7